United States Patent
Lai et al.

(10) Patent No.: US 9,401,959 B1
(45) Date of Patent: Jul. 26, 2016

(54) NETWORK FOLDER RESYNCHRONIZATION

(71) Applicant: Dropbox, Inc., San Francisco, CA (US)

(72) Inventors: John Lai, San Francisco, CA (US);
Elmer Charles Jubb, IV, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 14/975,601

(22) Filed: Dec. 18, 2015

(51) Int. Cl.
*G06F 17/30* (2006.01)
*H04L 29/08* (2006.01)

(52) U.S. Cl.
CPC ...... *H04L 67/1095* (2013.01); *G06F 17/30368* (2013.01)

(58) Field of Classification Search
None
See application file for complete search history.

(56) References Cited

U.S. PATENT DOCUMENTS

| | | | | | |
|---|---|---|---|---|---|
| 2,044,205 | A | * | 6/1936 | Bruner | A01B 15/18 172/103 |
| 5,774,717 | A | * | 6/1998 | Porcaro | G06F 11/1435 |
| 6,088,717 | A | * | 7/2000 | Reed | H04L 29/06 707/999.01 |
| 6,345,288 | B1 | * | 2/2002 | Reed | H04L 63/045 707/999.001 |
| 8,271,731 | B2 | * | 9/2012 | Surtani | G06F 12/0866 711/119 |
| 8,819,827 | B1 | * | 8/2014 | Easttom | G06F 21/51 713/150 |
| 8,996,797 | B1 | * | 3/2015 | Zheng | G06F 17/30327 711/103 |
| 2005/0141519 | A1 | * | 6/2005 | Rajgopal | H04L 45/00 370/395.32 |
| 2011/0213931 | A1 | * | 9/2011 | Surtani | G06F 12/0866 711/119 |
| 2011/0246970 | A1 | * | 10/2011 | Ganai | G06F 11/3608 717/132 |
| 2012/0036134 | A1 | * | 2/2012 | Malakhov | G06F 9/5016 707/747 |
| 2013/0103940 | A1 | * | 4/2013 | Badea | H04L 43/50 713/160 |
| 2014/0028914 | A1 | * | 1/2014 | Polak | H04N 5/04 348/515 |
| 2015/0142742 | A1 | * | 5/2015 | Hong | G06F 17/30097 707/634 |
| 2015/0163302 | A1 | * | 6/2015 | Armstrong | H04L 67/06 709/217 |
| 2015/0215389 | A1 | * | 7/2015 | Spencer | H04L 67/1002 707/741 |

* cited by examiner

*Primary Examiner* — Hung Le
(74) *Attorney, Agent, or Firm* — Fenwick & West LLP

(57) ABSTRACT

Resynchronization of folders shared among multiple client devices over a network is provided. Metadata and hash values stored on the client device are moved from a metadata database to a resynchronization database, and the data in the metadata database is deleted. Metadata is created for locally stored synchronized files. For each file, the created metadata is compared to the metadata stored in the resynchronization database. If the metadata matches, hash values are retrieved from the resynchronization database and stored with the created metadata in the metadata database. If the metadata does not match, hashes for the file are created and stored with the created metadata in the metadata database. A synchronization operation may be performed which consists of comparing the files stored on the client to the synchronized versions on a host server and updating or adding files that are not present or not up to date.

20 Claims, 6 Drawing Sheets

NETWORK FOLDER RESYNCHRONIZATION

BACKGROUND

1. Field of the Invention

The described embodiments relate generally to sharing of data over a network, and in particular to resynchronization of files and folders on a client device.

2. Description of Related Art

Synchronizing files and folders across multiple client devices allows users of clients to keep files up to date across multiple client devices. Synchronization processes allow new files and modifications to files to be transmitted to synchronized clients to keep files up to date. However, synchronization errors may limit the effectiveness of network folder synchronization. For example, metadata databases may become corrupted such that certain files or folders do not synchronize properly or are not accessible on client devices. Some previous solutions to the problem include manually removing and replacing files from synchronized folders. However, this can be time consuming and may be ineffective, causing users to search elsewhere for file synchronization solutions.

SUMMARY

The described embodiments enable resynchronization of files and folders shared among multiple clients over a network. Files and folders are synchronized with a host system and one or more client devices. As users make changes to files and folders on client devices, those changes are propagated to the synchronized version on the host server. Clients that are synchronized with respect to a file or folder register with the host system and obtain a current version of the synchronized file or folder and its contents. As the contents of the synchronized folder are changed on any of the client devices, the changes are propagated to the host system, which in turn delivers the changes to each of the clients registered as sharing that folder. In this way, each client participating in the share has a current version of the folder and its contents.

Changes to files are propagated to and from the host system by transferring only sets of blocks of a file that have undergone changes. This reduces network utilization and allows synchronization to proceed without interrupting the user's experience, while enabling the user to work on a file that is local to the client device. Clients may hash received blocks so that a particular version of a file may be identified as a block list, which is a concatenation of the hashes of its blocks. Clients may additionally create other metadata relating to files and folders, such as a file or folder's path, modification time, size, whether it is a directory, and file attributes. Hashes and metadata are stored in a metadata database on the client device.

In response to certain conditions or events such as synchronization errors, a resynchronization process may be necessary to achieve proper synchronization. During a resynchronization process, a client creates new versions of metadata for stored synchronized files. A resynchronization process may be initiated, for example, automatically by a client in response to a synchronization error. The metadata and hash values stored on the client device are copied from the metadata database to a resynchronization database, and the data in the metadata database is deleted so that the metadata database may be rebuilt. The client identifies locally stored synchronized files and creates new metadata for the identified files.

In many instances, the benefits of resynchronization (e.g., achieving proper synchronization) may be realized without rehashing all files associated with the resynchronization. Further, rehashing files consumes substantial client computing resources and increases the duration of the resynchronization process. Thus, it is advantageous to avoid rehashing files unless rehashing is necessary. Accordingly, the client only rehashes files for which it deems rehashing necessary. To determine whether rehashing is necessary, the client compares the created metadata for each file to the metadata stored in the resynchronization database. If the metadata matches, it indicates that the stored data corresponding to the file is valid, and rehashing the file is unnecessary. In this case, the client retrieves the hash values that were copied to the resynchronization database earlier in the resynchronization process and stores the hash values and created metadata in the metadata database. If the metadata does not match, this indicates that the file needs to be rehashed. In this case, the client creates new hashes for the file and stores the hashes and created metadata in the metadata database. The client then performs a synchronization operation consisting of comparing the files stored on the client device to the synchronized versions on the host server and updating or adding files that are not present or not up to date.

Hashing only files for which new metadata does not match stored metadata avoids unnecessary hashing processes for files with valid data. This allows resynchronization to consume fewer client computing resources and to occur more quickly, which improves the overall function of the file synchronization and the user experience.

DETAILED DESCRIPTION

System Architecture

Figure 1:
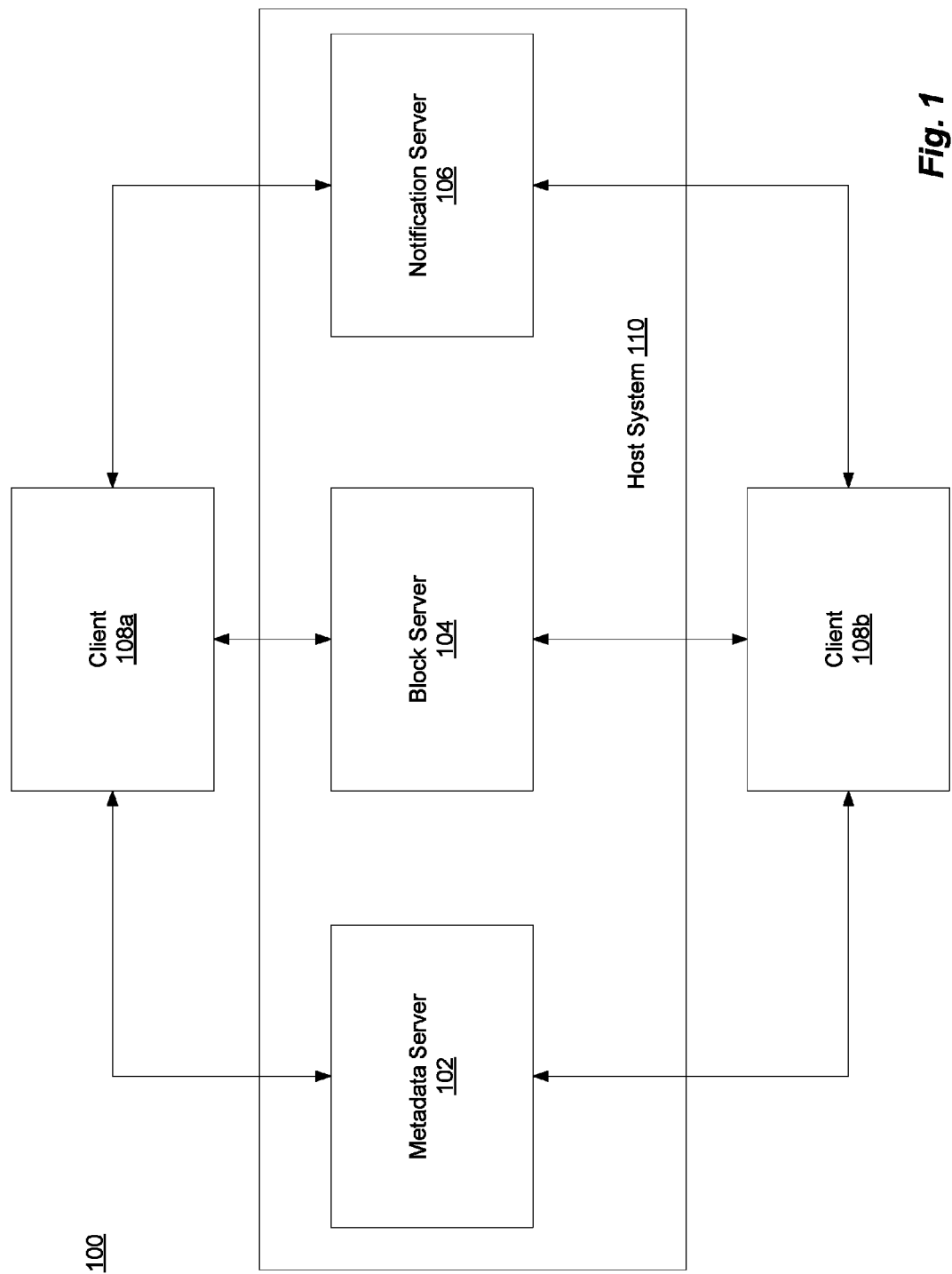
FIG. 1 is a block diagram of an example computing environment for maintaining synchronized shared folders in accordance with an embodiment of the present invention.

FIG. 1 is a block diagram of an example computing environment 100 for maintaining synchronized shared folders in accordance with an embodiment of the present invention. Computing environment 100 includes host system 110 and clients 108a, 108b. Host system 110 includes metadata server 102; block server 104; and notification server 106.

Metadata server 102 receives requests from clients 108 to update the host system's copy of synchronized folders and provides clients 108 with a list of metadata for files being synchronized. Block server 104 receives, stores, and serves blocks of data constituting synchronized files. Notification server 106 provides updates to clients 108 when a synchronized folder has been updated on the server, and provides those notifications to the clients. The operation of each of these components is described further below.

Note that in various embodiments, sharing occurs at the folder level—that is, a folder and any files in that folder are shared among client devices, and kept synchronized by the clients 108 and host system 110. Throughout this description therefore, we refer to both folders and files as being synchronized and shared.

Client 108 may be executed on a client device such as a personal computer (e.g., a desktop or laptop computer), a mobile device, or any other computing device having a file system. The client device may execute an operating system such as Microsoft Windows, Mac OS, Unix, etc., and includes memory, storage, a network interface, and other conventional computer hardware not illustrated in FIG. 1 for clarity. A client device creates, modifies and deletes files on its storage system, which includes a non-transitory computer-readable medium, in a conventional manner via its operating system, with the modifications described here. In addition, and as described further below, a client device includes one or more synchronized folders. In FIG. 1, only two clients 108a and 108b are shown, but any number of clients 108 may be sharing synchronized folders via host system 110.

Client devices enable users to create, modify and delete files on the client device's local file system, and for those actions to be synchronized with versions of the same files on host system 110 and on one or more other client devices. In one embodiment, a user creates a folder and designates it as one that should be synchronized, and its contents are then managed by client 108 to maintain that synchronization. In one embodiment, a user can create a shared synchronized folder either through a user interface portion of client 108, or via a web server.

Figure 2:
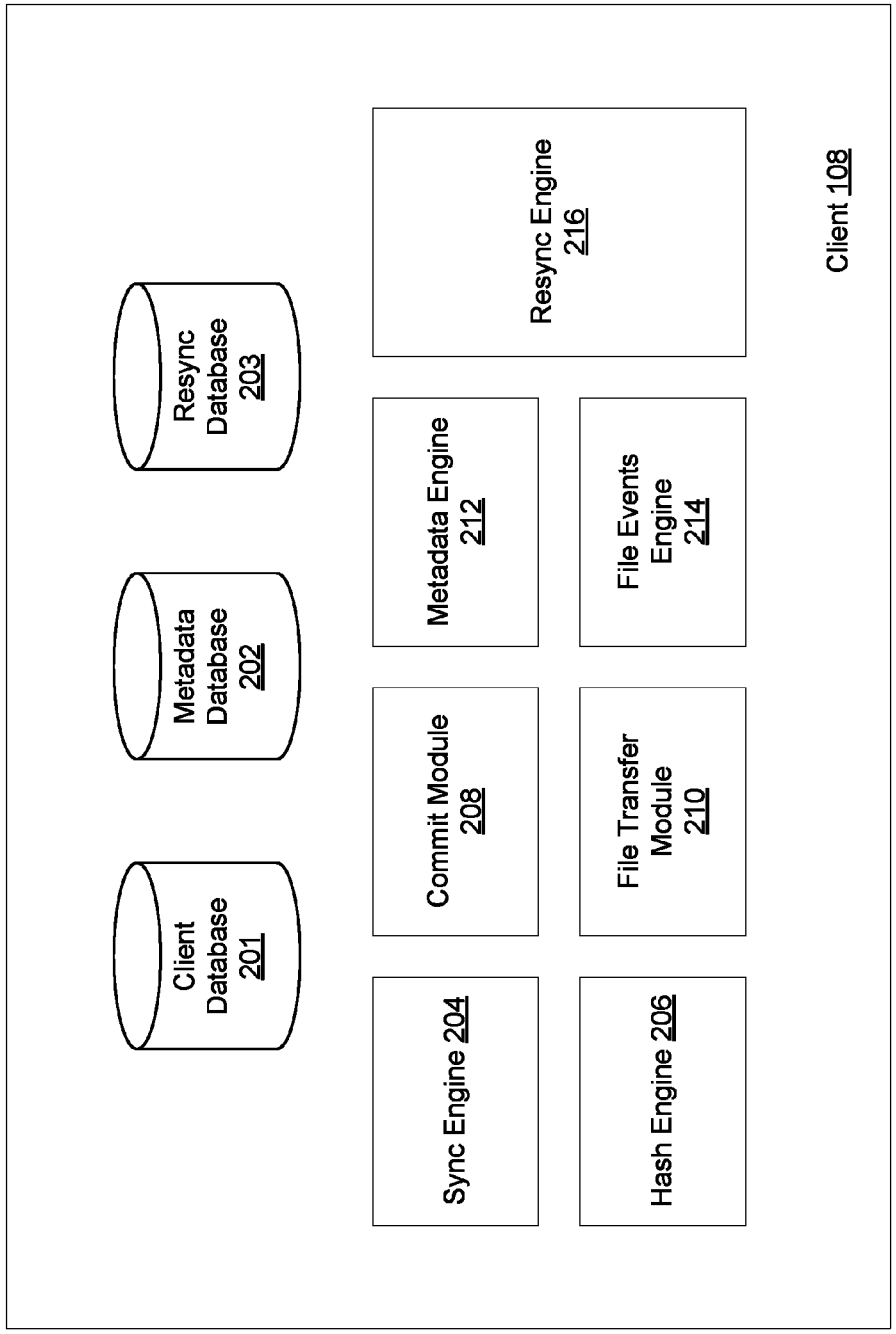
FIG. 2 is a block diagram of a client for maintaining synchronized shared folders in accordance with an embodiment of the present invention.

FIG. 2 is a block diagram providing a more detailed view of client 108 in accordance with an embodiment of the present invention. Client 108 includes a client database 201, a metadata database 202, a resync database 203, a sync engine 204, a hash engine 206, a commit module 208, a file transfer module 210, a metadata engine 212, a file events engine 214, and a resync engine 216. The operation of each of these modules is described further below.

Synchronizing a New File

Figure 3:
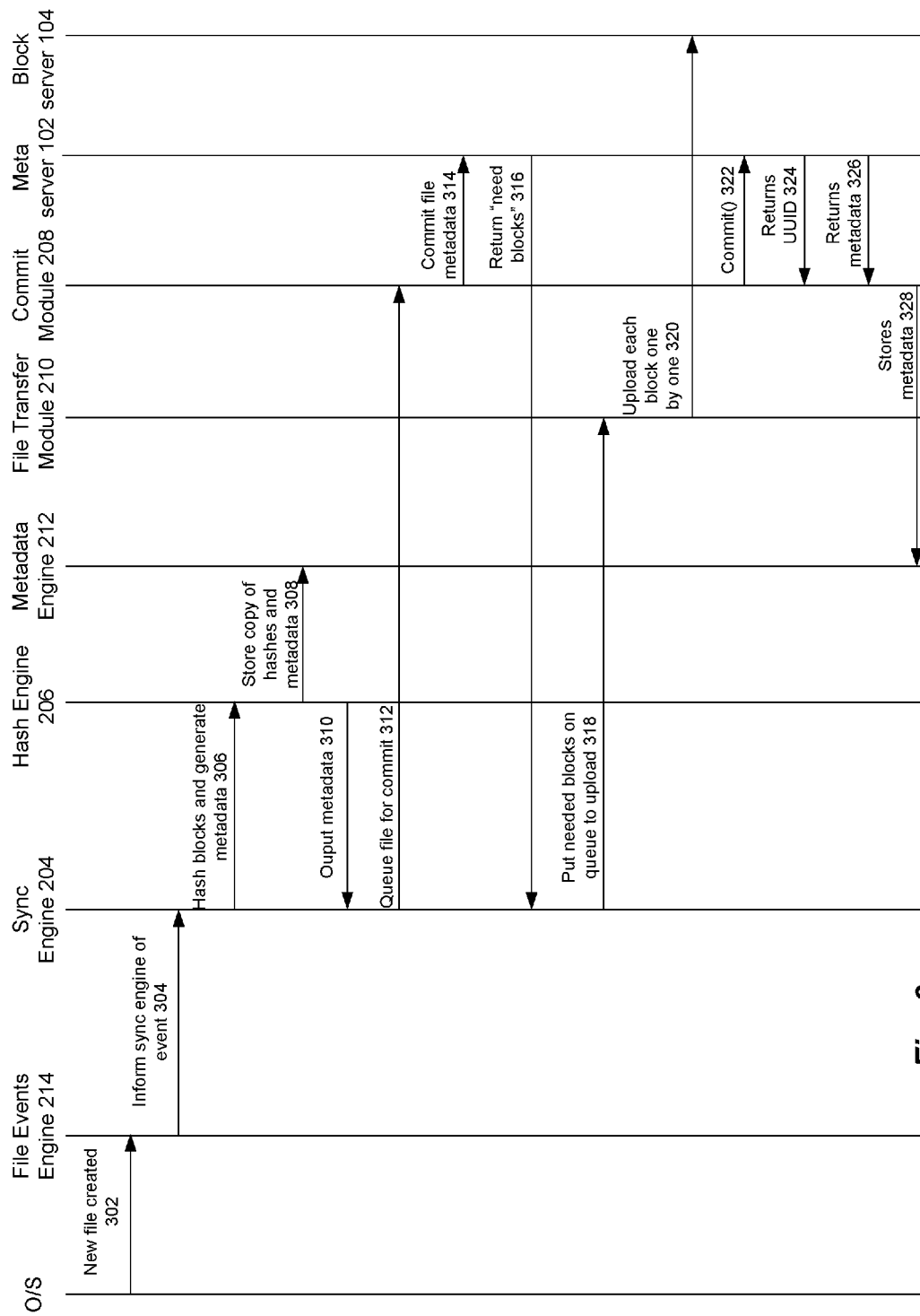
FIG. 3 is an interaction diagram illustrating synchronization of a new folder in accordance with an embodiment of the present invention.

For purposes of illustration, and with reference to FIG. 3, we first consider the situation in which a user adds a new file to a synchronized folder. File events engine 214 monitors the state of files in the synchronized folder to detect new files, modified files, and removed files. In various embodiments, file events engine 214 receives 302 a message from the operating system indicating that a change has occurred to the synchronized folder. In alternative embodiments, file events engine 214 identifies changes by, for example, comparing attributes of files in the folder on a periodic basis. Upon determining that a change has occurred to the synchronized folder, file events engine 214 informs 304 synchronization engine 204 that a change has been detected, and the location (path) of the folder or file within the folder where the change has occurred. In this case, the change to the folder is the addition of a new file.

Figure 4:
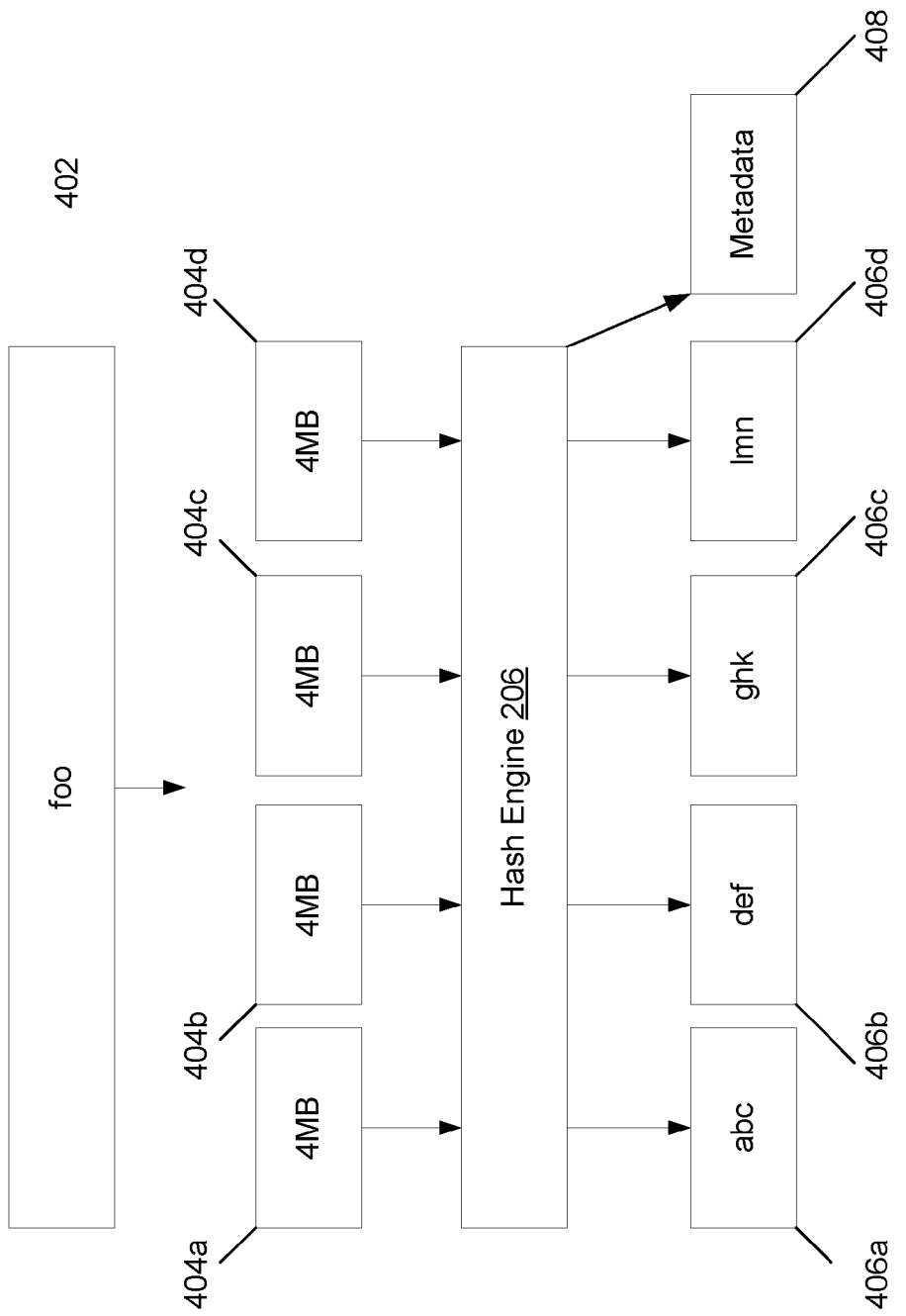
FIG. 4 illustrates a grouping and hashing process for files in accordance with an embodiment of the present invention.

In various embodiments, and referring also now to FIG. 4, synchronized files 402 are grouped into fixed-sized blocks 404a, 404b, 404c, 404d. The block sizes may be, for example, 2 MB, 4 MB, etc., according to the preference of the implementer. After sync engine 204 is informed by file events engine 214 that a change has occurred, sync engine 204 instructs 306 (FIG. 3) hash engine 206 to create a hash of blocks 406a, 406b, 406c, 406d. Hash engine 206 hashes each of the blocks in the file using any of a variety of known hashing algorithms, which in one embodiment is the SHA256 function. A particular version of file 402 can be identified as a concatenation of the hashes of its blocks, referred to as a block list. In the illustrated case, for example, the block list for this version of file 402 is (abc, def, ghk, lmn). In addition, hash engine 206 also creates metadata 408 related to the changed file, including its path, modification time, size, whether it is a directory, and file attributes including, for example, permission settings. Metadata engine 212 stores 308 a copy of the hashes and the metadata 408 in the metadata database 202. Hash engine 206 then returns 310 the metadata and block list to sync engine 204.

Continuing with FIG. 3, sync engine 204 next provides 312 the metadata to commit module 208, and commit module 208 issues 314 a commit command, which includes the metadata 408, to metadata server 102. Since the file is new and therefore being synchronized for the first time, metadata server 102 has no record of the blocks in the block list associated with the file 402. Metadata server 102 responds 316 to commit module 208 with a message, for example, "need blocks (abc, def, ghk, lmn)," indicating that host system 110 requires the blocks identified in the block list. Sync engine 204 instructs 318 file transfer module 210 to transfer the needed blocks, and file transfer module 210 adds the blocks to a queue of blocks to be transferred to block server 104 when a connection is opened. In one embodiment, each block and its associated hash value is transferred 320 to block server 104, and block server 104 uses the received hash as a check value by computing a hash of the received blocks. File transfer module 210 then informs sync engine 204 that the blocks have been successfully transferred, and block server 104 informs metadata server 102 of the blocks that have been received.

Once the needed blocks have been transferred, sync engine 204 instructs 322 commit module 208 to reissue the commit command to metadata server 102. Metadata server 102 recognizes that block server 104 now has the blocks listed in the block list of the metadata 408, and accepts the metadata 408, keeping a record of it. Metadata server 102 returns 324 to commit module 208 a unique ID (UUID) associated with the version of the file 402 specified by the metadata 408. Metadata server 102 may also return 326 metadata 408 updated with additional information to the commit module 208, such storage locations on block server 104 (e.g., inodes or volume IDs where blocks are stored). Metadata engine 212 stores 328 the updated metadata in the metadata database 202.

Modifying a Synchronized File

Figure 5:
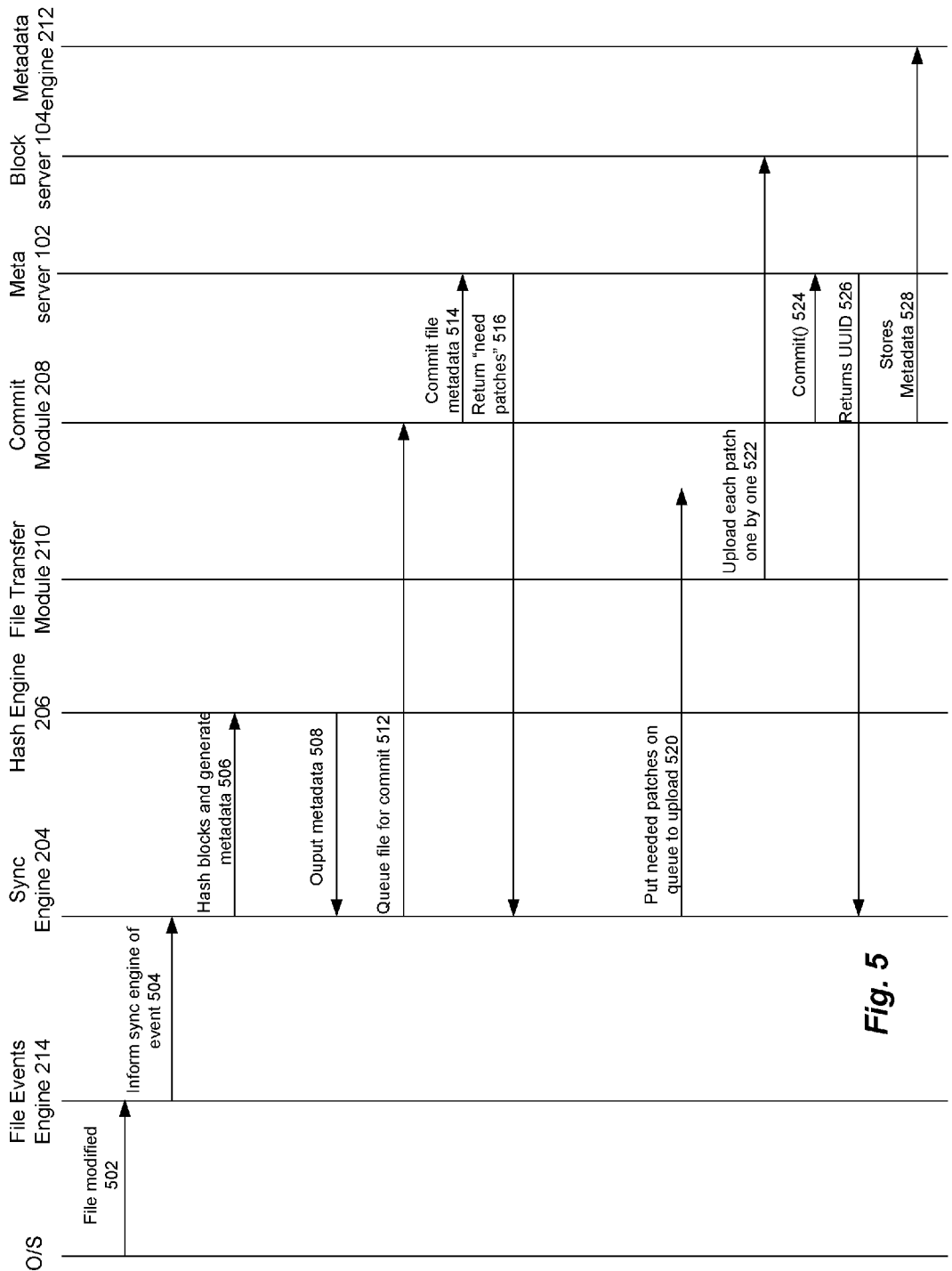
FIG. 5 is an interaction diagram illustrating synchronization of a modified folder in accordance with an embodiment of the present invention.

FIG. 5 is an interaction diagram illustrating synchronization of a modified file in accordance with an embodiment of the present invention. File events engine 214 receives 502 a notification from the operating system indicating that a change has occurred to the synchronized folder. In alternative embodiments, file events engine 214 identifies changes by, for example, comparing attributes of files in the folder on a periodic basis. Upon determining that a change has occurred to the synchronized folder, file events engine 214 informs 504 synchronization engine 204 that a change has been detected, and the path of the folder or file within the folder where the change has occurred.

Sync engine 204 then instructs 506 hash engine 206 to create a hash of blocks 406a, 406b, 406c, 406d. Hash engine 206 hashes each of the blocks in the changed file, resulting in a block list. In addition, hash engine 206 also creates other metadata 408 as described above. Hash engine 206 then returns 508 the hashed blocks and metadata including the block list to sync engine 204.

Next, sync engine 204 provides 512 the metadata to commit module 208, and commit module 208 issues 514 a commit command to metadata server 102. In one embodiment, the data provided by commit module 208 to metadata server 102 includes the modification time, the block list of the updated files as well as the block list of the previous version of the file, which is known as the parent block list. Assuming the new blocks have not yet been seen by block server 104, metadata server 102 asks 516 client 108 to provide the missing blocks. Sync engine 204 generates a patch for each new block that can be applied to its parent block, and instructs 520 file transfer module 210 to transfer those patches. A patch can be created using multiple methods known to those of skill in the art, for example rsync. File transfer module 210 adds the patches to a queue of blocks to be transferred to block server 104 when a connection is opened. In one embodiment, each patch and its associated hash value is transferred 522 to block server 104, and block server 104 uses the received hash as a check value by computing a hash of the received blocks. File transfer module 210 then informs sync engine 204 that the patches have been successfully transferred, and block server 104 informs metadata server 102 of the blocks that have been received.

Once the needed blocks have been transferred, sync engine 204 instructs 524 commit module 208 to reissue the commit command to metadata server 102. Metadata server 102 recognizes that block server 104 has the blocks listed in the block list of the metadata 408, and accepts the metadata 408, keeping a record of it. Metadata server 102 returns 526 to commit module 208 a unique ID (UUID) associated with the version of the file 402 specified by the metadata 408. Metadata engine 212 updates 528 the metadata stored in the metadata database 202.

Synchronizing Across Multiple Clients

As described above, a client 108 with a synchronized folder informs host system 110 when a file in a synchronized folder has been added, modified or deleted. Other clients may also have versions of the same synchronized folder, which are updated via host system 110 as follows.

Referring again to FIG. 1, assume that a user of a first client 108a has created a folder and invited a user of client 108b to share the folder. The folder is immediately synchronized on host system 110 as described above. In addition, both client 108a and client 108b are noted by notification server 106 as being associated with that folder. In one embodiment, each of the clients registers with notification server 106; in alternative embodiments notification server is informed by metadata server 102 or by the originating client 108a of the sharing relationship.

When metadata server 102 receives and successfully executes a commit instruction, notification server 106 in one embodiment informs all clients subscribed to that folder that the folder contents have changed. In an alternative embodiment, the client that initiated the change is not informed of the change.

Upon receiving the notification, each client 108 sends a list request to metadata server 102, and in response receives file metadata for all files in subscribed folders. Each client 108 stores the received file metadata in metadata database 202. The client then examines the block list for each file and identifies any listed blocks that the client does not already have in its database 201. File transfer module 210 then asks block server 104 for the block if the block is new, or a patch from the parent block the client is in possession of to the updated block the client needs. Block server 104 provides the block to the client or creates the patch and provides it to client 108 in response to the request. Client 108 then stores the block or applies the patch to the parent block to obtain the updated block, which it then stores. Client 108 repeats the process for each new block or block that needs updating. At the conclusion of the process, the client's version of the file is synchronized with the updated version on host system 110.

In one embodiment, clients 108 maintain an open network connection to notification server 106. Where an open connection is not possible or feasible, the connection is kept alive as much as practical, and reestablished as necessary.

Resynchronization

In certain instances, clients 108 perform a resynchronization process with the host system 110. Resynchronization may be performed, for example, if a client 108 experiences errors during the synchronization processes discussed above. Resynchronization may be initiated by client 108 or host system 110. For example, notification server 106 may inform client 108 that a resynchronization process is necessary or resync engine 216 may inform host system 110 that resynchronization is necessary.

In one embodiment, resync engine 216 deletes the data in the metadata database 202 and rebuilds metadata database 202 by rehashing locally stored files and performing a synchronization operation.

Figure 6:
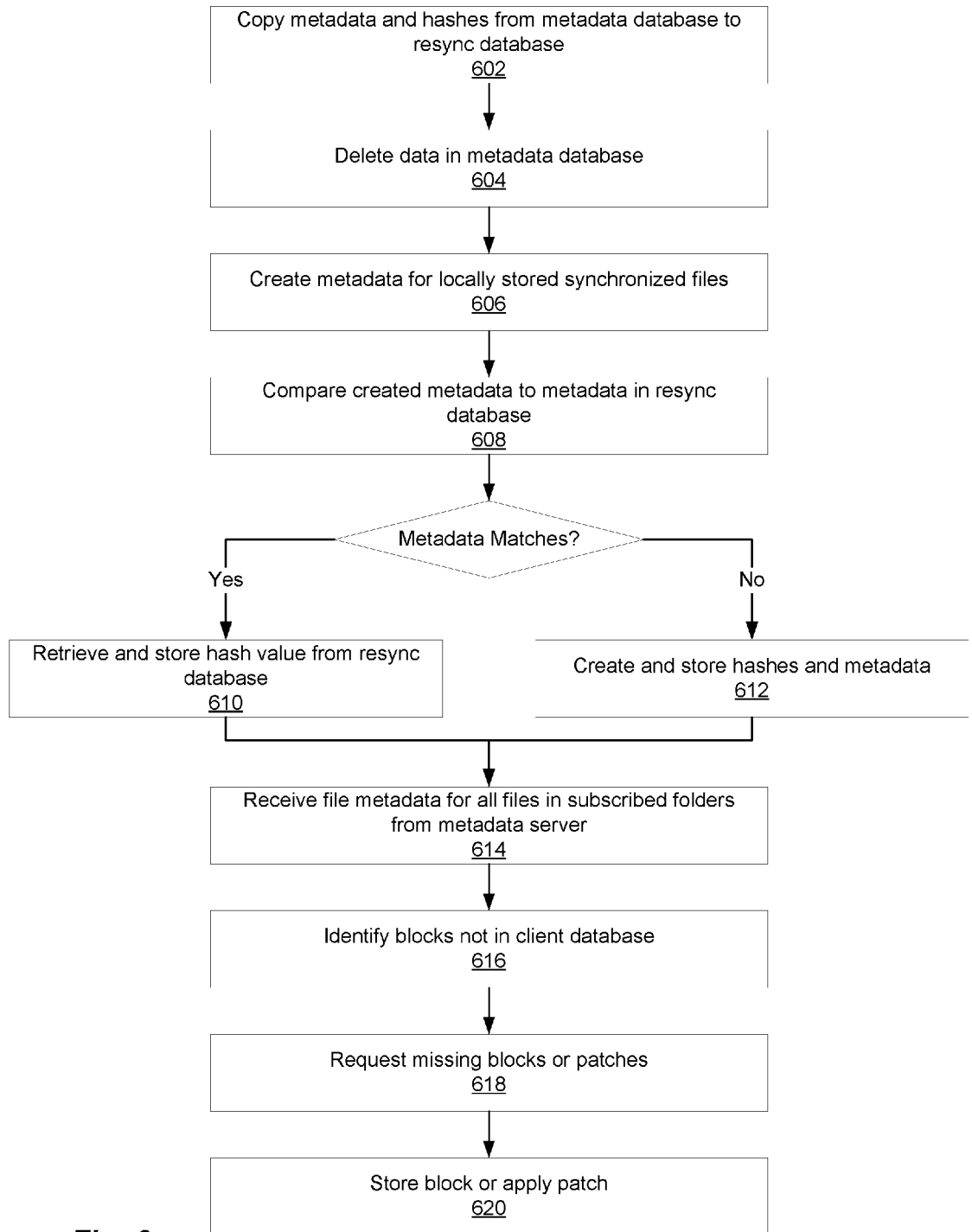
FIG. 6 is a flowchart illustrating a process for resynchronizing files in accordance with an embodiment of the present invention.

In another embodiment, resynchronization is performed without rehashing every file. FIG. 6 is a flowchart illustrating a process for resynchronizing files without rehashing every file, according to one embodiment. After initiation of the process, resync engine 216 copies 602 the file metadata and hashes stored in metadata database 202 to the resynchronization database 203. Resync engine 216 then deletes 604 all data in metadata database 202. In another embodiment, resync engine 216 moves the file metadata and hashes stored in metadata database 202 to the resynchronization database 203. Resync engine 216 identifies locally stored synchronized files (e.g., by identifying files within synchronized folders). Hash engine 206 creates 606 metadata 408 for the identified files as described above, but it does not hash the blocks at this stage.

For each reconstructed file, resync engine 216 compares 612 the metadata created in step 606 to the metadata stored in resynchronization database 203. If the metadata matches, the data is presumed to be valid and does not need to be rehashed. Resync engine 216 retrieves 610 from resynchronization database 203 the hash value corresponding to the file and stores the created metadata and the hash value in metadata database 202. If the metadata does not match, this indicates a difference between the reconstructed data and previous data, and the data must be rehashed. The resync engine 216 instructs 612 hash engine 206 to create hashes of file blocks and metadata as described above and stores the hashes and metadata in metadata database 202. Resync engine 216 repeats steps 608-612 for each additional file.

Once hash values are copied or created for each file, resync engine 216 sends a list request to metadata server 102, and in response receives 614 file metadata for all files in subscribed folders. Resync engine 216 then examines the block list for each file and identifies 616 any listed blocks that in need of updating or are not stored in client database 201. If a block is not stored in client database 201, a new block must be requested. If a block is stored in client database 201 but is out of date (e.g., corresponds to an older file version), a patch to update the block may be requested. File transfer module 210 requests 618 blocks or patches from block server 104. Block server 104 provides the block to the client 108 or creates the patch and provides it to resync engine 216 in response to the request. Resync engine 216 then stores 620 the block or applies the patch to the parent block to obtain the updated block, which it then stores. Resync module 216 repeats the process for each identified block. At the conclusion of the process, the client's version of each file is synchronized with the version on host system 110.

As noted, client 108 may be executed on a computer system with various operating systems, including Microsoft Windows, Mac OS, Linux, and mobile operating systems such as Apple iOS. Where folders are shared, the sharing need not be between clients 108 running on the same operating system. For example, client 108a may be hosted by a Mac OS operating system while client 108b is on a system running Microsoft Windows.

A single user may have multiple computers, each of which may or may not be running the same operating system. Using system 100, the user can maintain documents and files in a synchronized folder, and have the contents of that folder available to him regardless of which of his computers and at which location he happens to be at the moment he needs them, without having to worry about which version is available on which computer.

The present invention has been described in particular detail with respect to a limited number of embodiments. Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "selecting" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored on a non-transitory computer readable storage medium, such as, but is not limited to, any type of disk including floppy disks, optical disks, DVDs, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

I claim:

1. A method comprising:
   creating new metadata for locally stored synchronized files;
   for each of the synchronized files, comparing the new metadata to stored metadata;
   responsive to the new metadata and the stored metadata matching:
      retrieving, from a resynchronization database, stored hashes corresponding to the synchronized file; and
      storing the retrieved hashes and the new metadata in a metadata database; and
   responsive to the new metadata and the stored metadata not matching:
      creating hashes for the synchronized file; and
      storing the created hashes and the new metadata in the metadata database.

2. The method of claim 1 wherein the metadata and the hashes are deleted from the metadata database before the new metadata is stored in the metadata database.

3. The method of claim 1 wherein each of the synchronized files is comprised of file blocks of a fixed size.

4. The method of claim 1 further comprising performing a synchronization operation such that each synchronized file is synchronized with a version of the file stored on a host system.

5. The method of claim 4 wherein the synchronization operation comprises:
  receiving, for each of a plurality of files on the host server, host metadata corresponding to a plurality of file blocks that constitute the file;
  for each one of the plurality of file blocks, determining whether the file block is stored in a client database;
  responsive to determining that the file block is not stored in the client database, receiving, from the host server, the file block.

6. The method of claim 4 wherein the synchronization operation comprises:
  receiving, for each of a plurality of files on the host server, host metadata corresponding to a plurality of file blocks that constitute the file;
  for each one of the plurality of file blocks, determining whether the file block is stored in a client database;
  responsive to determining that an outdated version of the file block is stored in the client database, receiving, from the host server, a patch for updating the outdated version of the file block to a current version.

7. The method of claim 1 wherein the metadata comprises at least one of file path, modification time, size, and file attributes.

8. A computer program product for rehashing synchronized files, the computer program product stored on a non-transitory computer readable medium and including instructions that when loaded into memory cause a computer processor to carry out the steps of:
  maintaining metadata and hashes corresponding to synchronized files;
  storing the metadata and the hashes in a resynchronization database;
  creating new metadata for locally stored synchronized files;
  for each of the synchronized files, comparing the new metadata to the stored metadata;
  responsive to the new metadata and the stored metadata matching:
    retrieving, from the resynchronization database, the stored hashes corresponding to the synchronized file; and
    storing the retrieved hashes and the new metadata in the metadata database; and
  responsive to the new metadata and the stored metadata not matching:
    creating hashes for the synchronized file; and
    storing the created hashes and the new metadata in the metadata database.

9. The computer program product of claim 8 wherein the metadata and the hashes are deleted from the metadata database before the new metadata is stored in the metadata database.

10. The computer program product of claim 8 wherein each of the synchronized files is comprised of file blocks of a fixed size.

11. The computer program product of claim 8 further comprising performing a synchronization operation such that each synchronized file is synchronized with a version of the file stored on a host system.

12. The computer program product of claim 11 wherein the synchronization operation comprises:
  receiving, for each of a plurality of files on the host server, host metadata corresponding to a plurality of file blocks that constitute the file;
  for each one of the plurality of file blocks, determining whether the file block is stored in a client database;
  responsive to determining that the file block is not stored in the client database, receiving, from the host server, the file block.

13. The computer program product of claim 11 wherein the synchronization operation comprises:
  receiving, for each of a plurality of files on the host server, host metadata corresponding to a plurality of file blocks that constitute the file;
  for each one of the plurality of file blocks, determining whether the file block is stored in a client database;
  responsive to determining that an outdated version of the file block is stored in the client database, receiving, from the host server, a patch for updating the outdated version of the file block to a current version.

14. The computer program product of claim 11 wherein the synchronization operation comprises:
  receiving, for each of a plurality of files on the host server, host metadata corresponding to a plurality of file blocks that constitute the file;
  for each one of the plurality of file blocks, determining whether the file block is stored in a client database;
  responsive to determining that an outdated version of the file block is stored in the client database, receiving, from the host server, a patch for updating the outdated version of the file block to a current version.

15. The computer program product of claim 8 wherein the metadata comprises at least one of file path, modification time, size, and file attributes.

16. A device for rehashing synchronized files, the device comprising:
  a processor configured to execute modules; and
  a memory storing the modules, the modules comprising:
    a metadata engine configured to maintain metadata and hashes corresponding to synchronized files;
    a resync engine configured to store the metadata and the hashes in a resynchronization database;
    a hash engine configured to create new metadata for locally stored synchronized files;
    the resync engine further configured to:
      for each of the synchronized files, compare the new metadata to the stored metadata;
      responsive to the new metadata and the stored metadata matching:
        retrieving, from the resynchronization database, the stored hashes corresponding to the synchronized file; and
        storing the retrieved hashes and the new metadata in the metadata database; and
      responsive to the new metadata and the stored metadata not matching:
        creating hashes for the synchronized file; and
        storing the created hashes and the new metadata in the metadata database.

17. The device of claim 16 wherein the resync engine is further configured to delete the metadata and the hashes from the metadata database before the new metadata is stored in the metadata database.

18. The device of claim 16 wherein each of the synchronized files is comprised of file blocks of a fixed size.

19. The device of claim 16 further comprising a sync engine configured to perform a synchronization operation such that each synchronized file is synchronized with a version of the file stored on a host system.

20. The device of claim 19 wherein the synchronization operation comprises:

receiving, for each of a plurality of files on the host server, host metadata corresponding to a plurality of file blocks that constitute the file;

for each one of the plurality of file blocks, determining whether the file block is stored in a client database;

responsive to determining that the file block is not stored in the client database, receiving, from the host server, the file block.

\* \* \* \* \*